July 18, 1967 W. E. POLITZ 3,331,386
ESCUTCHEON MOUNTING SLEEVE AND BODY CONNECTION MEANS
Filed June 23, 1965

INVENTOR.
W. E. POLITZ
BY Robbs Robb
attorneys

United States Patent Office 3,331,386
Patented July 18, 1967

3,331,386
ESCUTCHEON MOUNTING SLEEVE AND
BODY CONNECTION MEANS
William E. Politz, Delphi, Ind., assignor to Stephen A.
Young, Monticello, Ind.
Filed June 23, 1965, Ser. No. 466,208
4 Claims. (Cl. 137—359)

This invention relates to plumbing fixtures or fittings and particularly to concealed fittings, said concealed fittings being mounted behind walls and on many occasions at different depths or distances therewithin.

As the foregoing suggests, the mounting of valve bodies within walls which bodies are thereby classed as concealed fittings may be effected within relatively wide limits depending upon the person installing them and as a result the trim which is used exteriorly thereof and over the face of the wall, to conceal the area immediately around the portions of the valve which extend through the wall, must be adjustable within relatively wide limits to accommodate for these variations.

Since the necessity to provide for variations in installation depths of the valves in the wall is present provisions to mount the usual trim exteriorly of the wall are necessarily compelled to be adjustable, and over a fairly wide range in any event, and therefore the cost of providing for adjustment is under some circumstances relatively high unless inexpensive provisions can be made therefor.

The principal object of the present invention is to make provisions for adjustment of the ultimate trim on the fittings previously described, over the wide range suggested, effected by what is known as sliding sleeve construction which makes possible mounting an escutcheon on a sleeve and adjusting the same thereon to accommodate for the depth of installation of the fitting behind the wall.

Since the cost of making the provision for adjustment is substantial where a number of control levers extend through the wall and in large installations becomes quite a factor, if this can be done more inexpensively, obviously the cost of manufacture is going to be reduced and the cost to the ultimate consumer similarly so reduced. Thus, the instant invention is directed to reducing the cost of making the provisions heretofore suggested.

In the sliding sleeve construction of the instant invention, the actual material from which the provisions for sliding of an escutcheon on the sleeve are constructed, has been reduced in cost by using lighter weight material and yet since it is necessary to provide threaded areas, an insert which is itself threaded and pressed into the lighter weight material is used, this serving several functions in the assembly.

One of the functions previously suggested, is the attaching of the sleeve to the body directly, and since this is often effected from a position in which the actual attitude of the body with respect to the face of the wall is not readily apparent, piloting of the sleeve into the threaded engagement is very helpful, provision being made therefore by the instant invention.

In addition, since the materials from which the parts hereof are made, are different metallurgically, under some circumstances if moisture is present as would be the case where it develops interiorly of the walls, corrosion may take place and thus the difficulty of removing the sleeve where repair of the fitting makes this necessary is increased.

Another object of the invention from the foregoing therefore is the provision of a sliding sleeve construction which facilitates the movement of air in or around the fitting itself while within the wall without at the same time requiring that special construction of the wall and the arrangement of the fitting therewithin, since this is effected by the actual construction of the sliding sleeve itself.

Other and further objects of the invention will be understood from a consideration of the specification appended hereto and disclosed in the drawing wherein.

Figure 1:
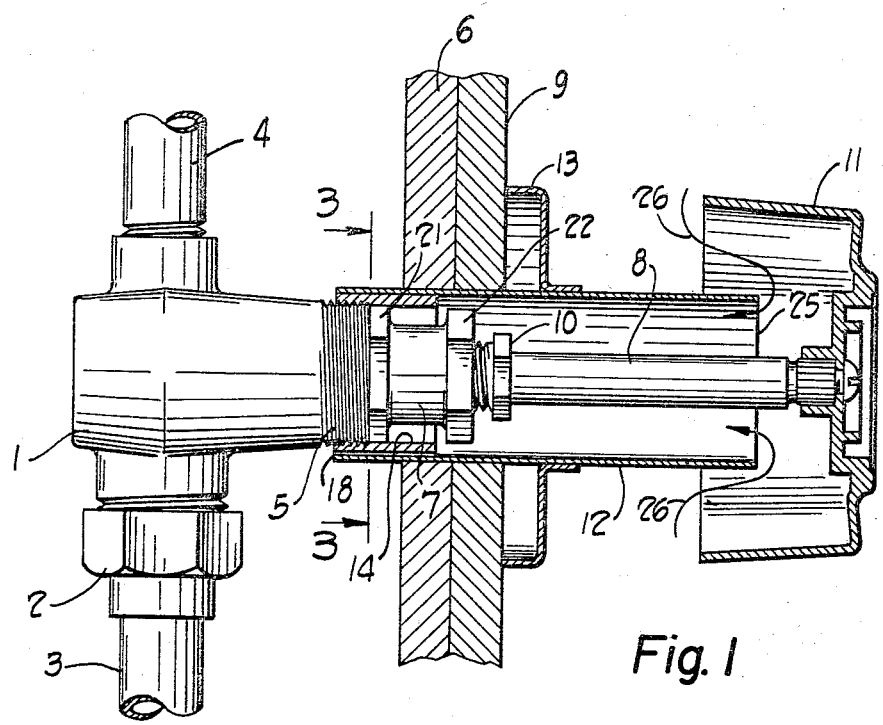
FIGURE 1 is a sectional view in elevation illustrating the relationship of the various parts about full scale or slightly larger, and further showing a typical installation in accordance with the concept hereof.

Referring now to the drawing, and particularly FIGURE 1, a valve of conventional construction is denoted 1 having the usual ground joint coupling 2 to provide for the connection of the supply 3 with the valve body 1.

Valve body 1 is intended to regulate or control the flow of water through a pipe such as 4 which may lead to a shower or the like from within the body.

The valve body itself is shown as having an extended portion on the outer end of which is a threaded section 5, the threaded section being on the surface of the valve body 1 for purposes which will be explained.

The valve body 1 is as suggested located behind a wall 6, and as such necessarily must provide for the control of the flow of water through the valve body by having control levers which extend outwardly of the wall so that they can be manipulated.

In this instance only a single valve body is illustrated and there is shown a bonnet 7 which together with a stem 8 extend toward the outer side of the wall 6, the outer side being denoted 9.

The usual stuffing box nut 10 is provided and a handle 11 is shown mounted on the end of the stem 8.

The foregoing parts are adapted to be surrounded by a sleeve generally denoted 12, which sleeve is in this instance formed of thin wall brass tubing for example, which surrounds both the stem and the bonnet as is illustrated and extends outwardly of the wall providing for the support on the outer end of the sleeve 12 of an escutcheon 13, said escutcheon 13 being provided to cover imperfections in the plastered area immediately around the opening through which the sleeve 12 extends and to enhance the general appearance of the ultimately installed fittings including the various parts heretofore described.

Figures 2, 3:
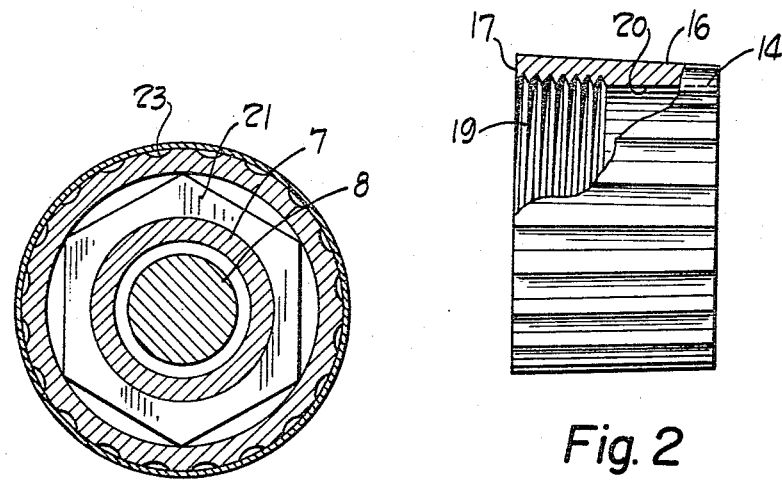
FIGURE 2 is a substantially enlarged side view of an insert such as will be described subsequently.
FIGURE 3 is a fragmentary sectional view taken about line 3—3 of FIGURE 1 looking in the direction of the arrows.

The sleeve 12 is further equipped at its inner end so to speak with an insert 14 shown in enlarged detail in FIGURE 2, and in this instance and for the purpose hereof made of a zinc die casting which as indicated is on its outer surface tapered as suggested at 16 so that it may be entered into the end of the tube or sleeve 12 and by a pressing operation moved into the position illustrated in FIGURE 1 with the end 17 of the insert 14 flush with the end 18 of the sleeve 12.

As is noted, the interior of the sleeve 14 is equipped with threads 19 adapted to co-act with the threads 5 for positioning of the sleeve and insert as illustrated in FIGURE 1.

The interior of the sleeve 14 is further generally cylindrical as suggested at 20, this cylindrical arrangement having a diameter substantially equal to the maximum diameter of the nut sections 21 and 22 of the bonnet 7 previously referred to.

This is illustrated in FIGURE 3, wherein the corners of the nut section are shown as about nearly in contact with the surface 20 as previously suggested, this arrangement providing for a piloting action when the sleeve 12 and insert are moved into position after the valve body 1 has been installed. The movement of the sleeve 12 and insert 14 are such that the threads 19 will properly engage the threads 5 without any cross interference, something which formerly often occurred since it is difficult to judge exactly the position of the body 1 when installed thus the piloting action is provided for by the construction hereof.

The exterior surface 16 of the insert 14 is fluted as indicated by the flutes 23 seen more particularly in FIGURE 3, so that there is in effect a series of passageways provided between the exterior surface of the insert 16 and the interior of the sleeve 12, this actually making possible substantial circulation of air by reason of the fact that the other end of the sleeve 12 is open as indicated at 25 air thus having access in the manner suggested by the arrows 26, passing into the interior of the sleeve 12 and thence through the fluted section provided on the insert 14 and between the interior surface of the sleeve 12.

Since the insert is a die casting as previously suggested, if there is any corrosion taking place, it will be minimized by the flow of air and make possible the removal of the sleeve under those circumstances where repair of the valve is necessary as to replace a washer or stem as the case may be.

Since the plastering is usually effected so that it closely encloses the sleeve 12 no other way for air to get into the wall is available, thus this venting arrangement effected by the sleeve 14 is of substantial value particularly under the conditions encountered in bathrooms.

In view of the foregoing, it will be apparent that an improvement is provided by making possible the placement of a sleeve of novel construction including an insert on a valve body, this being effected by the piloting action previously described and at the same time a flow of air is possible around the valve body so that the presence of moisture will not cause damage to the wall or fitting installed therewithin.

I claim:
1. In valve body construction of the class described, in combination, a valve body having a threaded extremity thereon, a bonnet extending from said extremity, a sliding sleeve removably engaged with the body and extending outwardly through a wall or the like, said sleeve being formed of thin walled tubing, an insert pressed in one end of the tubing, said insert having threads to engage the threaded extremity of the body aforesaid, said insert having an inner surface cooperating with the bonnet whereby to pilot the sleeve for thread interengagement and the insert is fluted on its outer surface to provide a series of passageway between the insert and sleeve to facilitate air movement through said passageways.

2. In valve body construction and mounting means, in combination, a valve body having a threaded extremity, a bonnet and stem extending into and from said extremity, a tubular sliding sleeve engaged with the body surrounding said bonnet and stem, an insert in said sleeve, said insert having threads for connection to the said extremity, air passageways between the sleeve and insert, said sleeve extending through a wall which closely surrounds the sleeve, the end of the sleeve being open, and a handle on the stem concealing the said open end.

3. The combination as claimed in claim 2, wherein the air passageways are provided by fluting on the outer surface of the insert when the insert is pressed into an end of the sleeve, the inner surface of the insert having the threads thereon.

4. The combination as claimed in claim 3, wherein the inner surface of the insert also provides for piloting of the sleeve and insert into place for connection to the body.

References Cited

UNITED STATES PATENTS

| 2,708,449 | 5/1955 | Keithley | 137—359 |
| 3,026,898 | 3/1962 | Weller | 137—359 |
| 3,043,330 | 7/1962 | Young | 137—359 |

FOREIGN PATENTS 194,339  1/1958  Austria.

M. CARY NELSON, *Primary Examiner.*